(12) United States Patent
Hamada

(10) Patent No.: US 8,749,658 B2
(45) Date of Patent: Jun. 10, 2014

(54) DATA PROCESSING DEVICE, IMAGE MATCHING METHOD, PROGRAM, AND IMAGE MATCHING SYSTEM

(75) Inventor: Yasushi Hamada, Tokyo (JP)

(73) Assignee: NEC Corporation, Tokyo (JP)

( * ) Notice: Subject to any disclaimer, the term of this patent is extended or adjusted under 35 U.S.C. 154(b) by 427 days.

(21) Appl. No.: 13/263,034

(22) PCT Filed: Mar. 23, 2010

(86) PCT No.: PCT/JP2010/054942
§ 371 (c)(1),
(2), (4) Date: Oct. 5, 2011

(87) PCT Pub. No.: WO2010/116885
PCT Pub. Date: Oct. 14, 2010

(65) Prior Publication Data
US 2012/0026354 A1 Feb. 2, 2012

(30) Foreign Application Priority Data

Apr. 6, 2009 (JP) ................................. 2009-091985

(51) Int. Cl.
*H04N 5/228* (2006.01)
*G06K 9/00* (2006.01)
(52) U.S. Cl.
USPC ........................................ 348/222.1; 382/118
(58) Field of Classification Search
CPC .................................................... G06K 9/6227
See application file for complete search history.

(56) References Cited

U.S. PATENT DOCUMENTS 5,912,992 A  6/1999 Sawada et al.
6,181,806 B1 * 1/2001 Kado et al. ..................... 382/118
(Continued)

FOREIGN PATENT DOCUMENTS

JP  5-81416 A  4/1993
JP  9-261464 A  10/1997
(Continued)

OTHER PUBLICATIONS

Ichiro Murase et al., Robust Matching by Increment Sign Correlation, The Transactions of the Institute of Electronics, Information and Communication Engineers, 2000, D-11, vol. J83-D-11, No. 5, pp. 1323-1331.

*Primary Examiner* — Albert Cutler
(74) *Attorney, Agent, or Firm* — Foley & Lardner LLP

(57) ABSTRACT

A data processing device 300 according to the present invention comprises difference value computing means 402, 412 that computes a difference value between a pixel value of a target pixel that is each pixel contained in an image and a pixel value of a pixel that is present at a predetermined neighboring relative position of the target pixel, representative value computing means 403, 413 that extracts a pixel group containing pixels that are similarly influenced by shading due to light from the image with respect to each pixel of the image and computes a representative value of difference values of the pixel group according to a statistical technique, feature value computing means 404, 414 that computes the feature value with respect to each pixel contained in the image based on comparison between the difference value with respect to each pixel and the representative value of difference values of the pixel group, and similarity determining means 301 that determines a similarity between the image and a predetermined image based on the feature value with respect to each pixel extracted by the feature value computing means.

20 Claims, 9 Drawing Sheets

(56) References Cited

U.S. PATENT DOCUMENTS

| | | | |
|---|---|---|---|
| 7,024,043 B1 | 4/2006 | Fujimoto et al. | |
| 2002/0006233 A1* | 1/2002 | Adachi et al. | 382/289 |
| 2002/0164074 A1* | 11/2002 | Matsugu et al. | 382/173 |
| 2008/0104011 A1* | 5/2008 | Shibasaki et al. | 707/1 |
| 2009/0091637 A1* | 4/2009 | Suzuki | 348/222.1 |
| 2009/0203964 A1* | 8/2009 | Shimizu et al. | 600/109 |
| 2010/0007773 A1* | 1/2010 | O'Connell et al. | 348/239 |
| 2010/0103297 A1* | 4/2010 | Motomura et al. | 348/294 |

FOREIGN PATENT DOCUMENTS

| | | |
|---|---|---|
| JP | 2000-181992 A | 6/2000 |
| JP | 2002-183732 A | 6/2002 |
| JP | 2003-141546 A | 5/2003 |
| JP | 2003-317084 A | 11/2003 |
| JP | 2004-213589 A | 7/2004 |
| JP | 2004-246618 A | 9/2004 |
| JP | 2004-304814 A | 10/2004 |
| JP | 2006-285312 A | 10/2006 |

\* cited by examiner

DATA PROCESSING DEVICE, IMAGE MATCHING METHOD, PROGRAM, AND IMAGE MATCHING SYSTEM

This application is the National Phase of PCT/JP2010/054942, filed Mar. 23, 2010, which claims priority to Japanese Application No. 2009-91985, filed Apr. 6, 2009, the disclosures of which are hereby incorporated by reference in their entirety.

TECHNICAL FIELD

The present invention relates to a data processing device that matches images.

BACKGROUND ART

Generally, image matching is used to identify a person and letters based on image information. In image matching, a target image in which a target object is captured and a reference image in which the object has been captured and stored are compared for similarity so as to identify a person or letters contained in the captured target image. Images are compared for similarity generally according to SAD (Sum of Absolute Difference), SSD (Sum of Squared Difference), ZNCC (Zero-mean Normalized Cross-Correlation), or the like.

These techniques compare luminance values of a target image and a reference image. Thus, when images of an object are captured, if illumination conditions of the target image and the reference image differ, the luminance values of these images will vary and thereby the accuracy of matching tends to deteriorate.

Non-patent Literature 1 proposes a technique called increment sign correlation that performs robust image matching under illumination variation. The increment sign correlation method extracts only the sign of increment (relationship of magnitude) of luminance values of adjacent pixels in the horizontal direction for each of a target image and a reference image. Let f(x, y) as the luminance value of coordinates (x, y), an increment sign value h(x, y) is defined as Formula (1).

[Mathematical Formula 1]

$$h(x, y) = \begin{cases} 1 & (\text{if } f(x+1, y) \geq f(x, y)) \\ 0 & (\text{otherwise}) \end{cases} \quad (1)$$

In the increment sign correlation, the number of pixels of which increment sign value of a target image matches that of a reference image is evaluated to match the images.

When illumination varies, the luminance value of each pixel and contrast (luminance difference) vary. Since the increment sign value represents the sign of the increment (relationship of magnitude) of luminance values of adjacent pixels, the increment sign value is hardly influenced by variation in the luminance value and contrast due to illumination variation.

Patent Literature 1 also proposes a technique that matches images for a target object using a plurality of reference images so as to improve the accuracy of matching. In Patent Literature 1, the increment sign values are obtained for each of a plurality of reference images and the probability of which the increment sign value becomes 1 is computed for each pixel. An image is generated based on computed probability values as pixel values and then the generated image and the target image are matched.

Patent Literature 2 presents a method that detects eyes from a facial image.

RELATED ART LITERATURE

Patent Literature

Patent Literature 1: JP2004-246618A, Publication
Patent Literature 2: JP2003-317084A, Publication Non-Patent Literature Non-patent Literature 1: Ichiro MURASE, Shunichi KANEKO, Satoru IKARASHI, "Robust Matching by Increment Sign Correlation," The Transactions of the Institute of Electronics, Information and Communication Engineers, D-11, Vol. J83-D-11, No. 5, pp. 1323-1331, 2000.

SUMMARY OF THE INVENTION

Problem to be Solved by the Invention

In the above-described Patent Literature 1, image matching tends to be easily influenced by shading due to the shape of a target object. FIG. 1 is a schematic diagram showing lettered spherical objects illuminated in a different way and their increment sign values. The upper left illustration shown in FIG. 1 represents an image of which an object is illuminated in front of the right, whereas the lower left illustration represents an image of which an object is illuminated in front of the left.

When the image of which the object is illuminated in front of the right is converted into increment sign values defined as Formula (1), an image shown in the upper right illustration is obtained; when the image of which the object is illuminated in front of the left is converted into increment sign values defined as Formula (1), an image as shown in the lower right illustration is obtained.

When these images are converted into increment sign values defined as Formula (1), if the luminance values increase from the left to the right of the image (the image becomes brighter from the left to the right), the increment sign values become 1; when the luminance values decrease from the left to the right (the image becomes darker from the left to the right), the increment sign values become 0. By showing the regions having an increment sign value of 1 as black and the regions having an increment sign value of 0 as white, when the image of which the object is illuminated in front of the right is converted into increment sign values, the image shown in the upper right illustration is obtained, when the image of which the object is illuminated in front of the left is converted into increment sign values, the image shown in the lower right illustration is obtained.

In other words, since increment sign values represent relative luminance in a object surface, as shown in FIG. 1, if the object is three-dimensional shape, increment sign values represent different characteristics depending on illumination direction. In a region that has a larger contrast than influenced by illumination variation, for example a letter pattern region, increment sign values represent the same characteristics. However, since a flat region with no letter patterns is strongly influenced by illumination variation, even if the shape of the object is the same, the increment sign values represent different characteristics. Thus, images having many flat regions and few characteristic patterns such as letter patterns are likely to be incorrectly matched.

For example, in the case of facial image matching, since it has larger non-characteristic regions such as forehead and cheeks than regions having characteristic patterns such as eyes, nose, and mouth, the matching is strongly influenced by illumination variation.

In addition, in the above-described Patent Literature 1, to improve the accuracy of matching, many reference images need to be collected for each target object. However, it is difficult to equally collect many reference images. To do that, it takes a long time and knowhow to initially set up the image matching system. In particular, in the case of facial image matching, many reference images need to be collected for each of the parts such as eyes, nose, and mouth. Thus, difficulty will rise.

A purpose of the present invention is to provide a technique that allows robust image matching to be easily performed under illumination variation.

Means that Solve the Problem

To accomplish the above-described object, a data processing device according to the present invention comprises:

difference value computing means that computes a difference value between a pixel value of a target pixel that is each pixel contained in an image and a pixel value of a pixel that is present at a predetermined neighboring relative position of the target pixel;

representative value computing means that extracts a pixel group containing pixels that are similarly influenced by shading due to light from the image with respect to each pixel of the image and that computes a representative value of difference values of the pixel group according to a statistical technique;

feature value computing means that computes the feature value with respect to each pixel contained in the image based on comparison between the difference value with respect to each pixel and the representative value of difference values of the pixel group; and similarity determining means that determines a similarity between the image and a predetermined image based on the feature value with respect to each pixel extracted by the feature value computing.

In addition, to accomplish the above-described object, an image matching method according to the present invention comprises:

computing a difference value between a pixel value of a target pixel that is each pixel contained in an image and a pixel value of a pixel that is present at a predetermined neighboring relative position of the target pixel;

extracting a pixel group containing pixels that are similarly influenced by shading due to light from the image with respect to each pixel of the image and computing a representative value of difference values of the pixel group according to a statistical technique;

computing the feature value with respect to each pixel contained in the image based on comparison between the difference value with respect to each pixel and the representative value of difference values of the pixel group; and determining a similarity between the image and a predetermined image based on the feature value with respect to each pixel.

In addition, to accomplish the above-described object, a program according to the present invention is a program of a data processing device that matches images, the program causing a computer to execute processes comprising:

computing a difference value between a pixel value of a target pixel that is each pixel contained in an image and a pixel value of a pixel that is present at a predetermined neighboring relative position of the target pixel;

extracting a pixel group containing pixels that are similarly influenced by shading due to light from the image with respect to each pixel of the image and computing a representative value of difference values of the pixel group according to a statistical technique;

computing the feature value with respect to each pixel contained in the image based on comparison between the difference value with respect to each pixel and the representative value of difference values of the pixel group; and determining a similarity between the image and a predetermined image based on the feature value with respect to each pixel.

In addition, to accomplish the above-described object, an image processing system according to the present invention comprises:

an image capturing device that captures a target object and outputs a captured image;

a storage device that stores a reference image of the target object that has been captured; and a data processing device that computes a difference value between a pixel value of a target pixel that is each pixel contained in an image and a pixel value of a pixel that is present at a predetermined neighboring relative position of the target pixel for each of the captured image and the reference image, extracts a pixel group containing pixels that are similarly influenced by shading due to light from the image with respect to each pixel of the image and computing a representative value of difference values of the pixel group according to a statistical technique for each of the captured image and the reference image, computes the feature value with respect to each pixel contained in the image based on comparison between the difference value with respect to each pixel and the representative value of difference values of the pixel group for each of the captured image and the reference image, and determines a similarity between the captured image and the reference image based on the feature value with respect to each pixel.

Effect of the Invention

According to the present invention, robust image matching can be easily performed under illumination variation.

BEST MODES THAT CARRY OUT THE INVENTION

Next, with reference to drawings, the present invention will be described in detail.

(First Embodiment)

The data processing device according to the present invention matches images based on the difference value of the luminance value of a target pixel and the luminance value of a pixel present at a predetermined relative position of the target pixel so as to perform robust image matching under illumination variation. However, such image matching involves a problem in which if light with which a target object is illuminated varies, it tends to be influenced by shading due to the shape of the object. On the other hand, when a object is illuminated, if a particular region of the object is considered, the influence of the shading due to illumination variation in this region is likely to be the same in the neighbor of the region.

Thus, the data processing device according to the present invention extracts a set of pixels that are similarly influenced by the shading due to the shape of the object under illumination variation. Then, the data processing device computes the statistical amount of difference values of the set and designates it as a representative value that represents the influence of the shading due to the shape of the object under illumination variation. The data processing device computes a feature value that represents the value in which the influence of the shading due to the shape of the object under illumination variation is removed from the difference value based on comparison between the representative value and the difference value. The data processing device matches images based on the feature value so as to reduce the influence of the shading due to the shape of the object under illumination variation.

Figure 1:
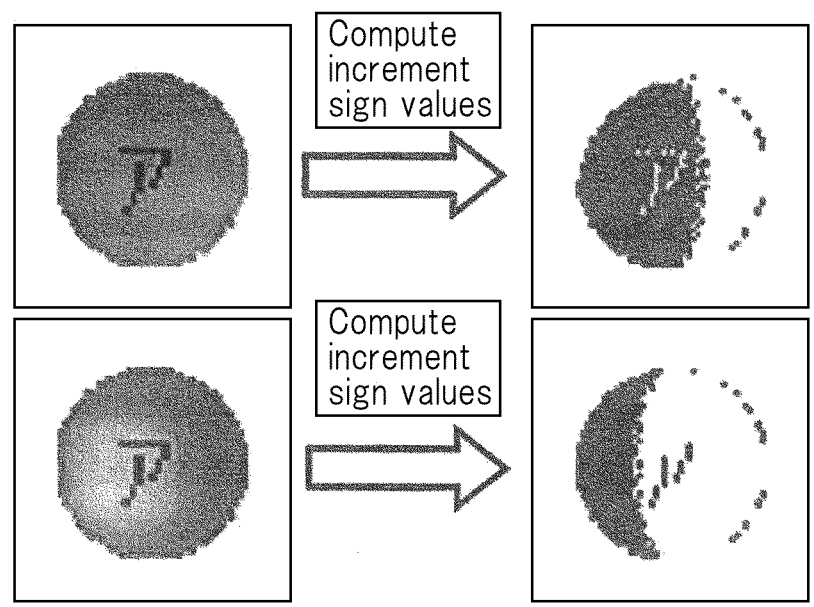
[FIG. 1] is a schematic diagram showing lettered spherical objects illuminated in a different way and their increment sign values.
Figure 2:
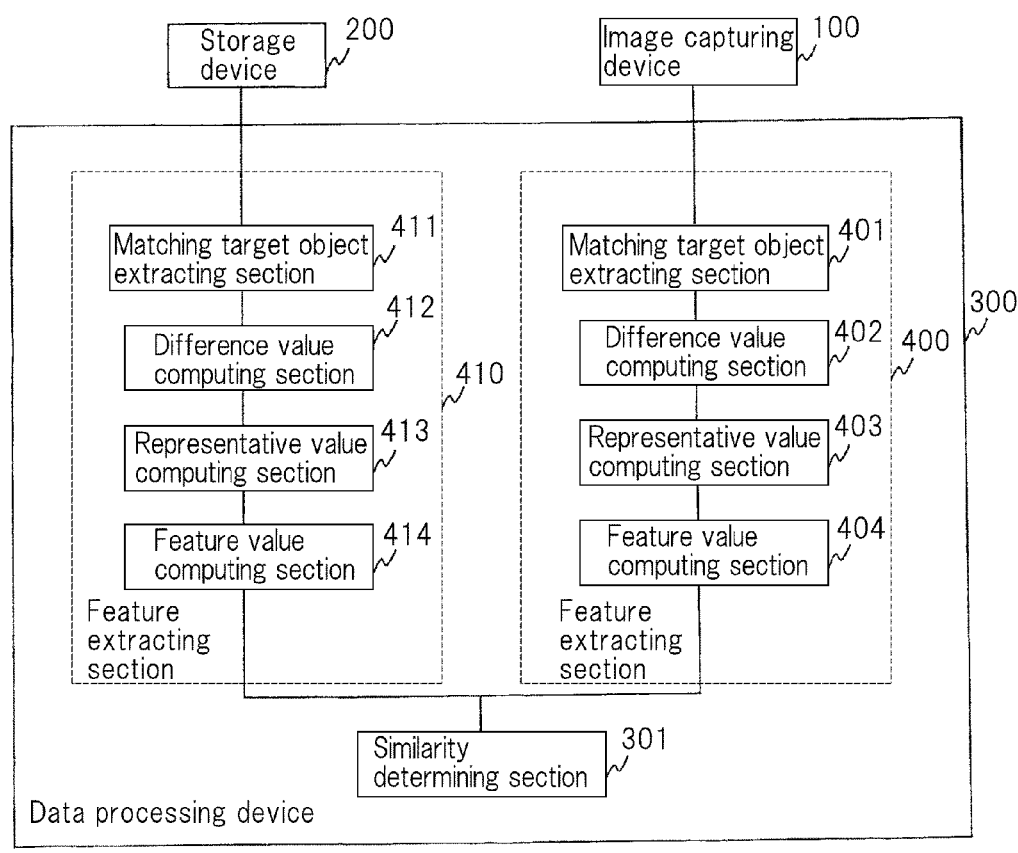
[FIG. 2] is a block diagram showing a structure of an image matching system according to a first embodiment.

FIG. 2 is a block diagram showing a structure of an image matching system according to a first embodiment.

As shown in FIG. 2, a data matching system according to the first embodiment has image capturing device 100, storage device 200, and data processing device 300.

Image capturing device 100 is a device that has a camera that captures a object to be matched and that outputs the captured target image.

Storage device 200 is a device that stores a reference image of a object to be matched in advance.

Data processing device 300 has similarity determining section 301 and a plurality of feature extracting sections 400 and 410.

The structure and operation of feature extracting section 400 are the same as those of feature extracting section 410. In the following, only the structure and operation of feature extracting section 400 will be described to prevent redundancy.

Feature extracting section 400 has matching target object extracting section 401, difference value computing section 402, representative value computing section 403, and feature value computing section 404.

Matching target object extracting section 401 identifies an area that represents a object to be matched from an image obtained from the outside and generates a normalized image in which image processes are performed for the object such that its position, size, and rotation become predetermined values.

Difference value computing section 402 computes the difference value of the luminance value of a target pixel and a pixel present at a predetermined neighboring relative position of the target pixel (the latter pixel is referred to as a pixel under comparison) for each pixel of the normalized image generated by matching target object extracting section 401. A pixel under comparison is for example a pixel that is present at a neighboring position of the target pixel in the positive or negative direction on the x coordinate or y coordinate.

Representative value computing section 403 first extracts a neighboring pixel group that is a set of pixels that are present at neighboring positions of the target pixel as those similarly influenced by the shading due to the shape of the object under illumination variation. Then, representative value computing section 403 obtains the statistical amount of the difference values with respect to each pixel contained in the neighboring pixel group and designates the obtained statistical amount as the representative value with respect to the target pixel. At this point, the representative value is the value that represents the influence of the shading due to the shape of the object under illumination variation. The statistical amount is for example a median or a mean value of difference values.

Feature value computing section 404 computes the feature value based on comparison between the difference value and the representative value with respect to the target pixel. The feature value represents a value in which the influence of the shading due to the shape of the object under illumination variation is removed from the difference value.

Similarity determining section 301 computes a correlation value that represents the similarity between the feature values obtained from feature extracting section 400 and feature extracting section 410 so as to determine the similarity between the image stored in storage device 200 and the image of the object captured by image capturing device 100.

Next, a process that data processing device 300 shown in FIG. 2 performs to determine the similarity between images will be described.

Figure 3:
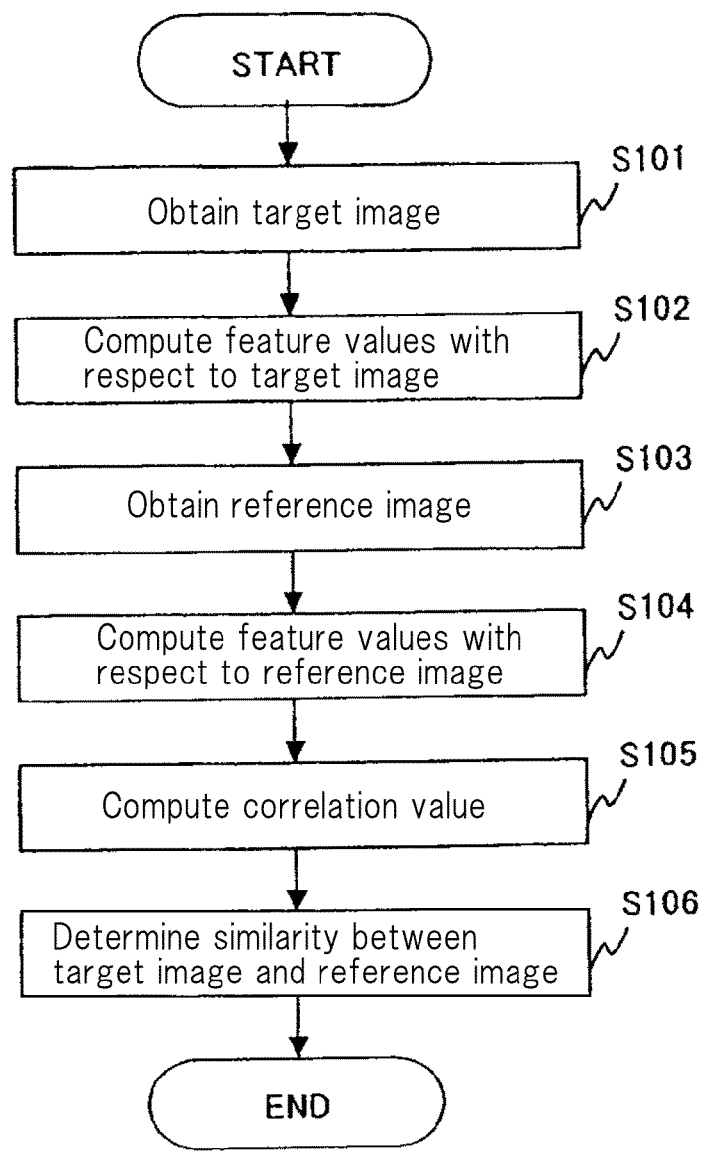
[FIG. 3] is a flow chart showing a process that data processing device 300 shown in FIG. 2 performs to determine the similarity between images.

FIG. 3 is a flow chart showing the process that data processing device 300 shown in FIG. 2 performs to determine the similarity between images.

First, feature extracting section 400 obtains a target image from image capturing device 100 (at step S101). The target image is an image of a object captured by for example a video camera and is pixel values arranged as a two-dimensional array.

Then, feature extracting section 400 computes a feature value with respect to the target image obtained from image capturing device 100 and outputs the feature value to similarity determining section 301 (at step S102).

Then, feature extracting section 410 obtains a reference image from storage device 200 (at step S103).

Then, feature extracting section 410 computes a feature value with respect to the reference image obtained from storage device 200 and outputs the feature value to similarity determining section 301 (at step S104).

Then, similarity determining section 301 computes correlation values with respect to the target image and the reference image based on the feature value with respect to the target image obtained from feature extracting section 400 and the feature value with respect to the reference image obtained from feature extracting section 410 (at step S105).

After computing the correlation values with respect to the target image and the reference image, similarity determining section 301 determines the similarity between the target image and the reference image based on the computed correlation values (at step S106).

If an image matching target is limited, namely one target image and one reference image are matched, after the similarity between the target image and the reference image is determined, the process is completed. In contrast, if there are a plurality of candidates to be matched, namely there are a plurality of reference images, the processes from step S103 to S106 are repeated so as to determine the similarity between the target image and each reference image.

Next, the feature value computing processes at steps S102 and S104 will be described.

The process at step S102 is a process that feature extracting section 400 performs for the image obtained from image capturing device 100, whereas the process at step S104 is a process that feature extracting section 410 performs for the image obtained from storage device 200. Since these processes are the same, only the process at step S102 will be described to prevent redundancy.

Figure 4:
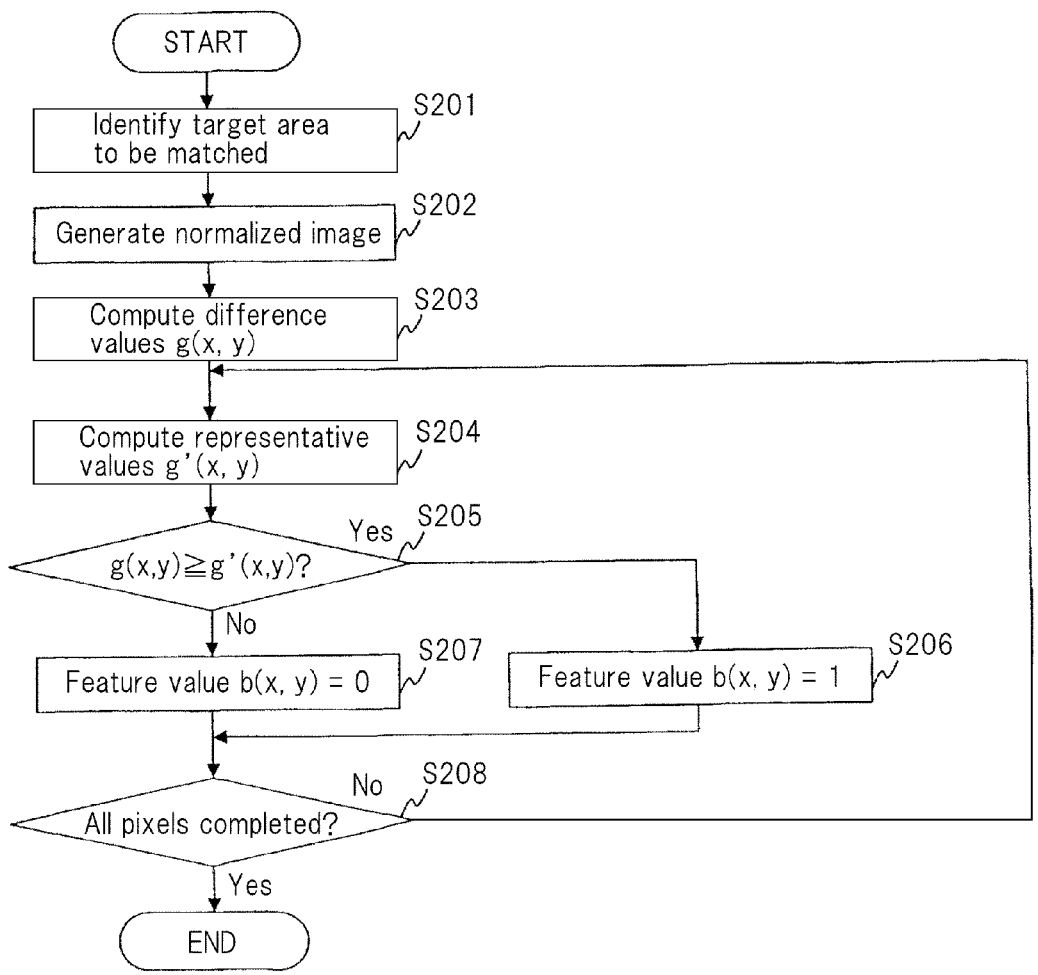
[FIG. 4] is a flow chart showing a feature value computing process according to the first embodiment.

FIG. 4 is a flow chart showing the feature value computing process according to the first embodiment.

First, matching target object extracting section 401 identifies an area that represents a target object to be matched from an image obtained from image capturing device 100 (at step S201). The position, size, and rotation of the object are detected based on such as the geometric shape of the profile and the pattern of the object to be matched. The method that detects the position, size and rotation of the object is presented for example in Patent Literature 2. Matching target object extracting section 401 decides the range in which the detected object is included from the obtained image.

Then, matching target object extracting section 401 generates a normalized image in such a manner that matching target object extraction section 401 performs an image process that scales or rotates the detected object such that its position, size, and rotation become predetermined values (at step S202).

Then, difference value computing section 402 computes the difference value of the luminance value of a target pixel and the luminance value of a pixel under comparison for each pixel contained in the normalized image (at step S203). The coordinates of the target pixel of the normalized image generated at step S202, the luminance value of the target pixel, and the difference value of the luminance value of the target pixel and the luminance value of the pixel under comparison are denoted by (x, y), f(x, y), and g(x, y), respectively. For example, when two pixels that are adjacent in the x direction are the target pixel and the pixel under comparison, the difference value g(x, y) can be computed according to Formula 2.

[Mathematical Formula 2]

$$g(x,y)=f(x+1,y)-f(x,y) \quad (2)$$

Then, representative value computing section 403 computes the representative value with respect to the target pixel (at step S204). The representative value is a value that represents the influence of the shading due to the shape of the object under illumination variation. A mass of connected areas are likely to be influenced similarly by the shading due to the shape of the object under illumination variation. Thus, a set of pixels that are similarly influenced by the shading due to the shape of the object under illumination variation is assumed and thereby the value of influence is defined based on the statistical amount of the set.

Representative value computing section 403 assumes a set of pixels that are present at neighboring positions of a target pixel as a set of pixels that are similarly influenced by the shading due to the shape of the object under illumination variation and designates the set of pixels that are present at the neighboring positions of the target pixel as a neighboring pixel group. For example, a set of pixels that are present in a circular area around the target pixel may be designated as a neighboring pixel group. Alternatively, a set of pixels that are present in a square area around the target pixel may be designated as a neighboring pixel group.

A set of pixels that are similarly influenced by the shading due to the shape of the object under illumination variation tend to be present in regions of connected areas that have similar difference values. Thus, a set of connected pixels that have difference values that differ from the difference value of the target pixel by a predetermined value or less may be designated as a neighboring pixel group.

Then, representative value computing section 403 obtains the statistical amount based on the difference value with respect to each pixel contained in the neighboring pixel group and designates the obtained statistical amount as the representative value with respect to the target pixel. The statistical amount is for example the median of difference values with respect to all pixels contained in the neighboring pixel group. When the median of difference values with respect to all pixels contained in the neighboring pixel group is designated as the representative value, the influence of outliers that are excessively larger or smaller values than the representative value can be reduced. The representative values g'(x, y) in which the statistical amount is a median can be expressed as Formula 3. In Formula 3, R(x, y) is a set of pixels that are present at neighboring positions of the target pixel.

[Mathematical Formula 3]

$$g'(x, y) = \underset{(i,j) \in R(x,y)}{\mathrm{median}}[g(i, j)] \quad (3)$$

The statistical amount may be the mean value of difference values with respect to all pixels contained in the neighboring pixel group.

If a set of connected pixels that have difference values that differ from the difference value of the target pixel by the predetermined value or less is designated as the neighboring pixel group, when the number of pixels contained in the neighboring pixel group is less than the predetermined threshold, it is affirmed that sufficient data to calculate the statistical amount are absent and the representative value is computed based on all pixels of the normalized image. At this point, alternatively, a predetermined value may be used as the representative value.

Then, feature value computing section 404 computes the feature value based on comparison between the difference value and the representative value with respect to the target pixel. The feature value represents a value in which the influence of the shading due to the shape of the object under illumination variation is removed from the difference value.

Feature value computing section 404 compares the difference value g(x, y) with the representative value g'(x, y) (at step S205). When the difference value g(x, y) is equal to or greater than the representative value g'(x, y), feature value computing section 404 sets the feature value b(x, y) to 1 (at step S206). In contrast, when the difference value g(x, y) is smaller than the representative value g'(x, y), feature value computing section 404 sets the feature value b(x, y) to 0 (at step S207). The process that feature value computing section 404 performs can be formularized as Formula 4.

[Mathematical Formula 4]

$$b(x, y) = \begin{cases} 1 & (\text{if } g(x, y) \geq g'(x, y)) \\ 0 & (\text{if } g(x, y) < g'(x, y)) \end{cases} \quad (4)$$

The representative value and the feature value are computed with respect to all pixels contained in the normalized image. Thus, feature extracting section 400 determines whether or not the representative value and the feature value have been computed with respect to all pixels contained in the normalized image (at step S208) and repeats the processes from step S204 to step S208 until the representative value and the feature value are computed with respect to all the pixels contained in the normalized image.

Next, the correlation value computing process presented at step S105 will be described.

Similarity determining section 301 computes a correlation value s of the target image and the reference image based on the feature value $b_a(x, y)$ of the target image obtained from feature extracting section 400 and the feature value $b_b(x, y)$ of the reference image obtained from feature extracting section 410. The correlation value is represented by the ratio of the number of pixels in which the feature value with respect to the target image matches the feature value with respect to the reference image. At this point, the correlation value s is expressed as Formula 5. In Formula 5, A represents the number of pixels contained in the normalized image.

[Mathematical Formula 5]

$$s = \frac{1}{A}\sum_{x,y} [b_a(x, y)b_b(x, y) + \{1 - b_a(x, y)\}\{1 - b_b(x, y)\}] \quad (5)$$

Since the feature value b(x, y) is represented by a binary value, Formula 5 may be the ratio of the number of pixels in which the correlation of coordinates (x, y) obtained by a logical operation expressed as Formula 6 becomes 1.

[Mathematical Formula 6]

$$\text{Correlation of coordinates } (x,y) = (b_a(x,y) \cap b_b(x,y)) \cup (\overline{b_a(x,y)} \cap \overline{b_b(x,y)}) \quad (6)$$

As described at step S106, similarity determining section 301 determines the similarity between the target image and the reference image based on the correlation value s. The similarity can be determined for example according to a method that compares the correlation value s with a predetermined threshold. When the correlation value is equal to or greater than the predetermined threshold, similarity determining section 301 determines that the target image is similar to the reference image; when the correlation value is smaller than the predetermined threshold, similarity determining section 301 determines that the target image is not similar to the reference image.

The structure of the image matching system is not limited to the structure shown in FIG. 2. For example, images obtained by two image capturing devices may be processed by feature extracting sections 400 and 410. Alternatively, different images stored in storage device 200 may be processed by feature extracting sections 400 and 410.

Likewise, the structure of the data processing device is not limited to the structure shown in FIG. 2. For example, feature extracting section 410 may be omitted.

In this case, the data processing device stores data of the feature value with respect to the reference image in advance. When the data processing device obtains a captured image from image capturing device 100, the data processing device computes the feature value only with respect to the captured image and compares the computed feature value with the feature value with respect to the reference image that has been stored so as to determine the similarity between the captured image and the reference image.

Alternatively, feature extracting section 400 may compute the feature values with respect to both the captured image obtained from image capturing device 100 and the reference image obtained from storage device 200.

As described above, according to this embodiment, the data processing device decides the feature value with respect to each pixel in a range of pixels where the influence of the shading under illumination variation is similar based on the difference value between the pixel value of the target pixel and the pixel value of the pixel under comparison with respect to each pixel. Thus, the influence of the shading under illumination variation in the image matching can be easily reduced.

In addition, according to this embodiment, since data of computed feature values with respect to reference images are stored in the data processing device in advance, a single feature extracting section provided in the data processing device can match images and thereby the structure of the data processing device can be simplified. In contrast, if a plurality of feature extracting sections are provided in the data processing device, since data of computed correlation values of reference images do not need to be stored in advance, reference images can be easily added.

Moreover, according to this embodiment, since the data processing device computes the amount of influence of the shading from a set of pixels that are present at neighboring positions of a target pixel or regions of connected pixels having difference values similar to the difference value of the target pixel, the data processing device can accurately obtain the amount of influence of the shading.

In addition, according to this embodiment, if a set of pixels similarly influenced by the shading due to the shape of the object under illumination variation is smaller than the predetermined value, since the data processing device computes the feature value based on the statistical amount with respect to all pixels contained in the image to be matched or based on a predetermined value, matching errors for regions where the influence of the shading cannot be estimated can be suppressed.

In addition, according to this embodiment, since the data processing device represents a feature value where the influence of the shading due to the shape of the object under illumination variation is removed from the target image as a binary value, the storage capacity for the feature value can be reduced and the process time necessary for the image matching can be shortened.

Alternatively, while the positions of the normalized image of the reference image and the normalized image of the target image are being moved, correlation values may be computed so as to absorb very small deviations of the position, size, and rotation of the normalized image generated at step S202 and then the largest correlation value can be designated as the correlation value of the reference image and target image. Alternatively, the normalized image of the reference image and the normalized image of the target image may be divided into a plurality of partial areas and the correlation values may be computed by moving the positions of the partial areas.

Thus, the similarity between the reference image and the target image can be more accurately determined.

(Second Embodiment)

According to the first embodiment, the similarity between images is determined based on one target pixel and one pixel under comparison. However, the present invention is not limited to such an example. Alternatively, the similarity between images may be determined based on one target pixel and a plurality of pixels under comparison. According to a second embodiment, the similarity between images is determined based on one target pixel and a plurality of pixels under comparison.

The structure of the image matching system according to the second embodiment is the same as the structure of the image matching system according to the first embodiment.

In the following, an image similarity determining process according to the second embodiment will be described.

A process that feature extracting section 400 performs to obtain a target image from image capturing device 100 is the same as the process at step S101 shown in FIG. 3 according to the first embodiment.

Likewise, a process that feature extracting section 410 performs to obtain a target image from storage device 200 is the same as the process at step S103 shown in FIG. 3 according to the first embodiment.

Next, a feature value computing process according to the second embodiment will be described.

Since the feature value computing process that feature extracting section 400 performs is the same as the feature value computing process that feature extracting section 410 performs, only the feature value computing process that feature extracting section 400 performs will be described to prevent redundancy.

Figure 5:
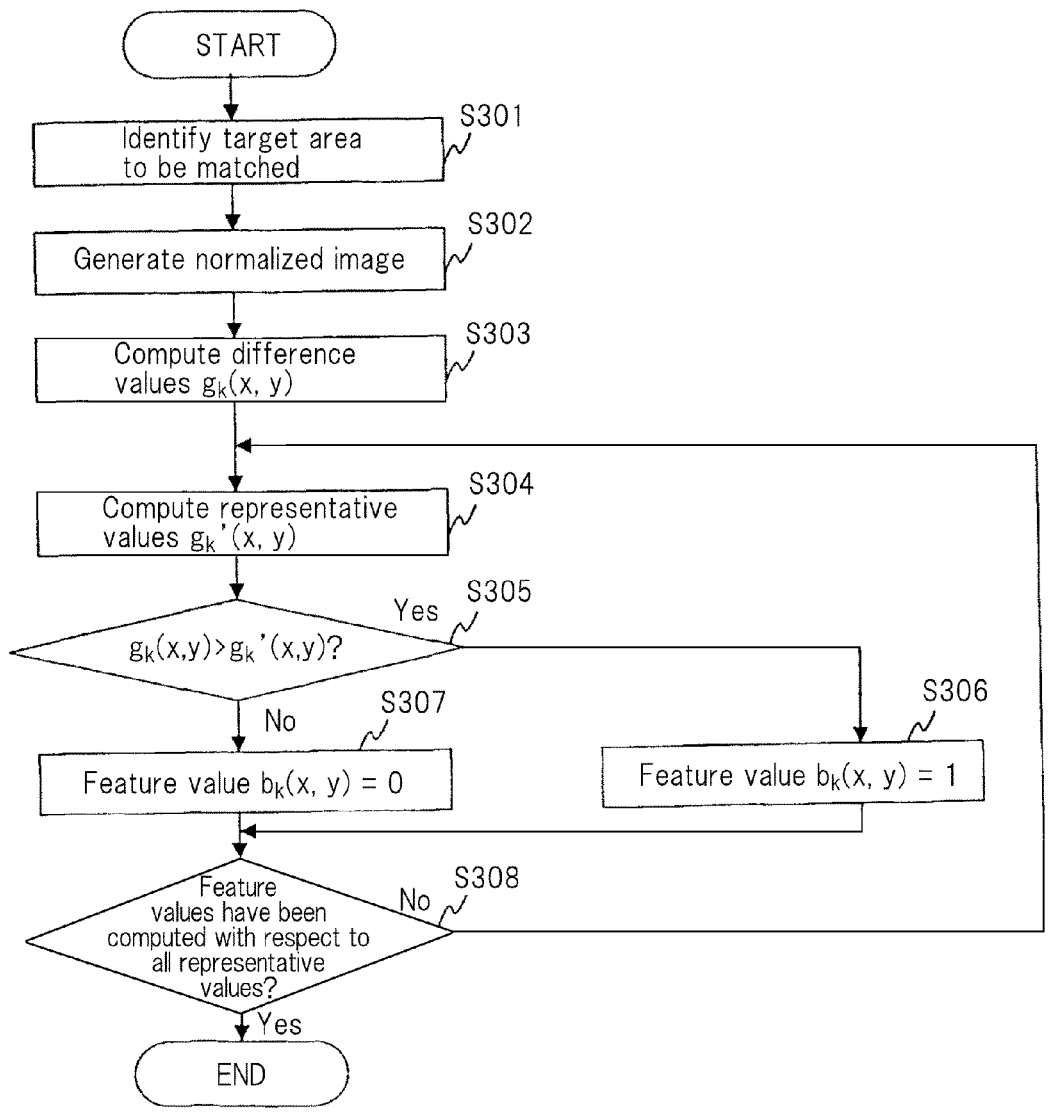
[FIG. 5] is a flow chart showing a feature value computing process according to a second embodiment.

FIG. 5 is a flow chart showing the feature value computing process according to the second embodiment.

Since a matching target area identifying process at step S301 and a normalized image generating process at step S302 according to the second embodiment are the same as those according to the first embodiment, their description will be omitted.

When matching target extracting section 401 generates a normalized image, difference value computing section 402 computes a difference value between the luminance value of a target pixel and the luminance value of each of a plurality of pixels under comparison for all pixels of the normalized image (at sep S303). Assuming that the coordinates of the target pixel are denoted by (x, y) and the coordinates of the plurality of pixels under comparison are denoted by $(x_1, y_1)$ to $(x_m, y_m)$, difference values $g_1(x, y)$ to $g_m(x, y)$ between the luminance value of the target pixel and the luminance value of each of pixels under comparison can be expressed as Formula 7.

[Mathematical Formula 7]

$$g_1(x, y) = f(x_1, y_1) - f(x, y) \quad (7)$$
$$\ldots$$
$$g_m(x, y) = f(x_m, y_m) - f(x, y)$$

Then, representative value computing section 403 computes representative values $g_1'(x, y)$ to $g_m'(x, y)$ based on the difference values $g_1(x, y)$ to $g_m(x, y)$ between the luminance value of the target pixel and the luminance value of each of pixels under comparison (at step S304). For example, when medians of the difference values with respect to all pixels contained in a neighboring pixel group of the target pixel are used, the representative values $g_1'(x, y)$ to $g_m'(x, y)$ can be expressed as Formula 8. In Formula 8, R(x, y) is a set of pixels that are present at neighboring positions of the target pixel.

[Mathematical Formula 8]

$$g_1'(x, y) = \underset{(i,j) \in R(x,y)}{\mathrm{median}}[g_1(i, j)] \quad (8)$$
$$\ldots$$
$$g_m'(x, y) = \underset{(i,j) \in R(x,y)}{\mathrm{median}}[g_m(i, j)]$$

Then, feature value computing section 404 compares feature values based on comparison between the difference values $g_1(x, y)$ to $g_m(x, y)$ with respect to the target pixel and each of pixels under comparison and the representative values $g_1'(x, y)$ to $g_m'(x, y)$ with respect to the target pixel (at steps S305 to S307). The process that feature value computing section 404 performs can be formularized as Formula 9.

[Mathematical Formula 9]

$$b_1(x, y) = \begin{cases} 1 & (\text{if } g_1(x, y) \geq g_1'(x, y)) \\ 0 & (\text{if } g_1(x, y) < g_1'(x, y)) \end{cases} \quad (9)$$
$$\ldots$$
$$b_m(x, y) = \begin{cases} 1 & (\text{if } g_m(x, y) \geq g_m'(x, y)) \\ 0 & (\text{if } g_m(x, y) < g_m'(x, y)) \end{cases}$$

Like the first embodiment, the representative values and feature values are computed with respect to all pixels of the normalized images. Thus, feature extracting section 400 determines whether or not the representative values and feature values with respect to all pixels of the normalized image have been computed (at step S308) and repeats the processes from step S304 to step S308 until the representative values and feature values with respect to all pixels of the normalized image are computed.

After the representative values and feature values with respect to all pixels of the normalized image have been computed, similarity determining section 301 computes matching values $s_1$ to $s_m$ with respect to the target image and the reference image from the feature values $b_{a1}(x, y)$ to $b_{am}(x, y)$ with respect to the target image obtained from feature extracting section 400 and the feature values $b_{b1}(x, y)$ to $b_{bm}(x, y)$ with respect to the reference image obtained from feature extracting section 410. If the ratios of pixels where the feature values with respect to the target image match the feature values with respect to the reference image is used as the correlation values, the correlation values $s_1$ to $s_m$ can be expressed as Formula 10. In Formula 10, A is the number of pixels contained in the normalized image.

[Mathematical Formula 10]

$$s_1 = \frac{1}{A} \sum_{x,y} [b_{a1}(x, y)b_{b1}(x, y) + \{1 - b_{a1}(x, y)\}\{1 - b_{b1}(x, y)\}] \quad (10)$$
$$\ldots$$
$$s_m = \frac{1}{A} \sum_{x,y} [b_{am}(x, y)b_{bm}(x, y) + \{1 - b_{am}(x, y)\}\{1 - b_{bm}(x, y)\}]$$

Similarity determining section 301 designates the mean values of the computed correlation values $s_1$ to $s_m$ as the correlation value of the target image and the reference image and determines the similarity between the target image and the reference image based on the mean value of the correlation values $s_1$ to $s_m$.

As described above, according to this embodiment, since the data processing device determines the similarity between images based on one target pixel and a plurality of pixels under comparison, the accuracy of the image matching can be improved under illumination variation at various angles and various intensity.

(Third Embodiment)

According to the first embodiment, a feature value is computed based on comparison between a difference value and a representative value with respect to the target pixel. At this point, when the difference value is greater than or equal to the representative value, the feature value is set to 1; whereas when the difference value is smaller than the representative value, the feature value is set to 0. Thus, when the case in which the difference value is greater than the representative value is not distinguished from the case in which the difference value is equal to the representative value, the accuracy of matching becomes rough. In particular, according to the present invention, since a representative value is obtained based on the statistical amount of difference values, the difference value tends to be the same as the representative value in other than areas that represent a feature such as the profile of the object.

To prevent such a problem, according to the third embodiment, a feature value is represented as a ternary value and the similarity between images is determined based on this feature value.

The structure of the image matching system according to the third embodiment is the same as the structure of the image matching system according to the first embodiment.

In the following, an image similarity determining process according to the third embodiment will be described.

A process that feature extracting section 400 performs to obtain a target image from image capturing device 100 is the same as the process at step S101 shown in FIG. 3 according to the first embodiment.

Likewise, a process that feature extracting section 410 performs to obtain a target image from storage device 200 is the same as the process at step S103 shown in FIG. 3 according to the first embodiment.

Next, a feature value computing process according to the third embodiment will be described.

Since the feature value computing process that feature extracting section 400 performs is the same as the feature value computing process that feature extracting section 410 performs, only the feature value computing process that feature extracting section 400 performs will be described to prevent redundancy.

Figure 6:
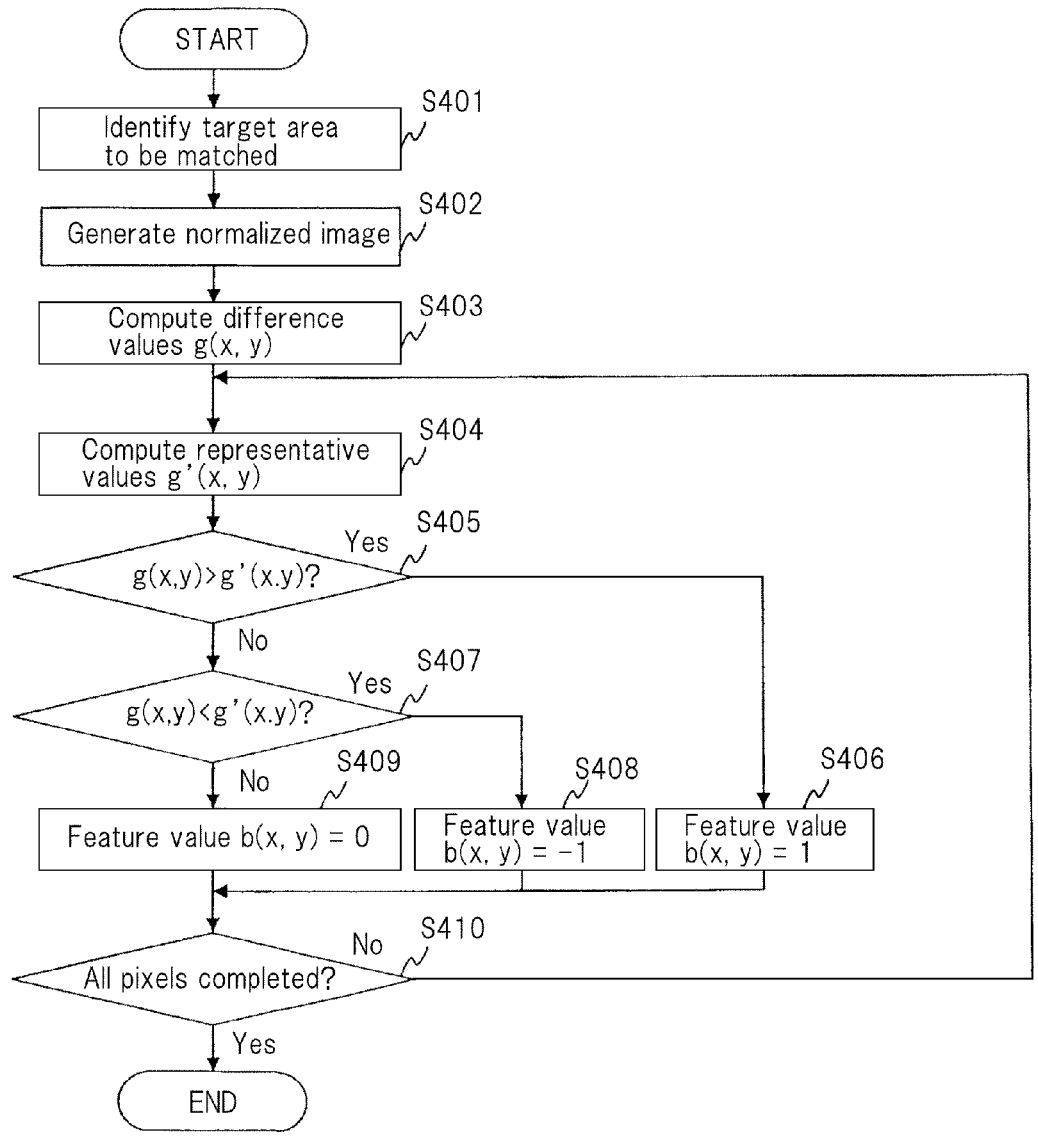
[FIG. 6] is a flow chart showing a feature value computing process according to a third embodiment.

FIG. 6 is a flow chart showing the feature value computing process according to the third embodiment.

Since a matching target area identifying process at step S401, a normalized image generating process at step S402, and a difference value computing process at step S403 are the same as those according to the first embodiment, their description will be omitted.

When difference value computing section 402 computes a difference value, representative value computing section 403 computes a representative value g'(x, y) with respect to the target pixel (at step S404). A process that representative value computation section 403 performs to compute the representative value g'(x, y) is the same as the process at step S204 shown in FIG. 4 according to the first embodiment.

Then, feature value computing section 404 computes a feature value based on comparison between the difference value and the representative value with respect to the target pixel.

Feature value computing section 404 determines whether or not the difference value g(x, y) is greater than the representative value g'(x, y) (at step S405). When the difference value g(x, y) is greater than the representative value g'(x, y), feature value computing section 404 sets the feature value b(x, y) to 1 (at step S406). In contrast, when the difference value g(x, y) is not greater than the representative value g'(x, y), feature value computing section 404 determines whether or not the difference value g(x, y) is smaller than the representative value g'(x, y) (at step S407). When the difference value g(x, y) is smaller than the representative value g'(x, y), feature value computing section 404 sets the feature value b(x, y) to −1 (at step S408). In contrast, when the difference value g(x, y) is not smaller than the representative value g'(x, y), feature value computing section 404 determines that the difference value g(x, y) is the same as the representative value g'(x, y), and feature value computing section 404 sets the feature value b(x, y) to 0 (at step S409).

The processes that feature value computing sections 404 and 414 perform can be formularized as Formula 11.

[Mathematical Formula 11]

$$b(x, y) = \begin{cases} 1 & (\text{if } g(x, y) > g'(x, y)) \\ 0 & (\text{if } g(x, y) = g'(x, y)) \\ -1 & (\text{if } g(x, y) < g'(x, y)) \end{cases} \quad (11)$$

Like the first embodiment, representative values and feature values are computed with respect to all pixels of the normalized image. Thus, feature extracting section 400 determines whether or not representative values and feature values with respect to all pixels of the normalized image have been computed (at step S410) and repeats the processes from step S404 to step S410 until representative values and feature values with respect to all pixels of the normalized image are computed.

After representative values and feature values with respect to all pixels of the normalized image have been computed, similarity determining section 301 computes a correlation value s of a target image and a reference image based on feature values $b_a(x, y)$ of the target image obtained from feature extracting section 400 and feature values $b_b(x, y)$ of the reference image obtained from feature extracting section 410. The correlation value s is represented for example by the ratio of pixels where the feature values with respect to the target image match the feature values with respect to the reference image.

After the correlation value of the target image and the reference image has been computed, similarity determining section 301 determines the similarity between the target image and the reference image based on the computed correlation value.

As described above, according to this embodiment, since the data processing device distinguishes the case in which a difference value is greater than a representative value from the case in which a difference value is equal to a representative value so as to match images, the accuracy of the image matching can be improved. In particular, the accuracy of the image matching can be improved for other than areas that represent a feature such as the profile of a target object.

(Fourth Embodiment)

According to the third embodiment, a feature value is represented as a ternary value and the similarity between images is determined based on this feature value. However, when a feature value is binary, it can be represented by one bit. In contrast, when a feature value is ternary, it needs to be represented by two bits. Thus, the storage capacity for a ternary feature value becomes twice the storage capacity for a binary feature value and thereby the processing time for which a correlation value of a target image and a reference image is computed based on a feature value with respect to the target image and a feature value with respect to the reference image adversely increases.

To prevent such a problem, according to the fourth embodiment, a feature value with respect to a pixel in which a difference value becomes equal to a representative value is randomly set to one of two values such that a feature value is represented as a binary value and the accuracy of the image matching is improved.

The basic structure of the image matching system according to the fourth embodiment is the same as the structure of the image matching system according to the first embodiment. However, according to the forth embodiment, a function that outputs a random number is added to each of feature value computing sections 404 and 414 provided in feature extracting sections 400 and 410 of data processing device 300.

Figure 7:
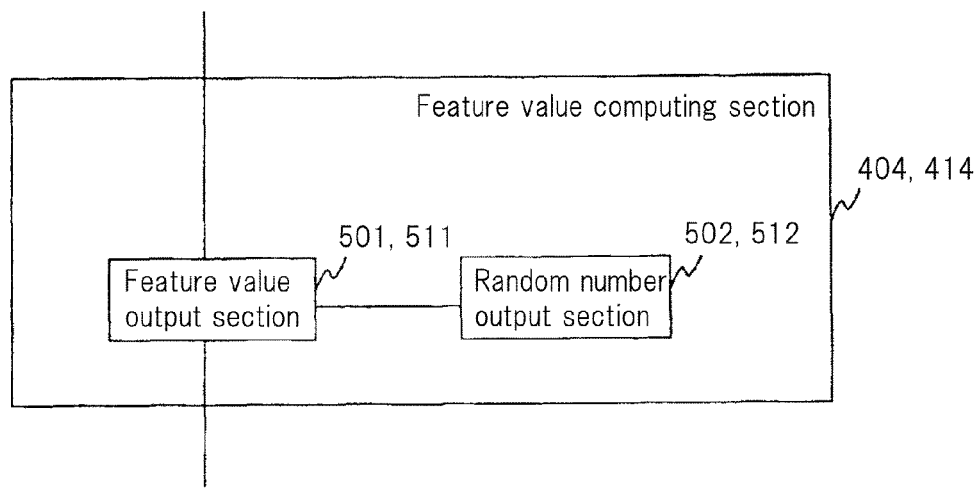
[FIG. 7] is a block diagram showing a structure of a feature value computing section according to a fourth embodiment.

FIG. 7 is a block diagram showing the structure of a feature value computing section according to the fourth embodiment.

As shown in FIG. 7, the feature value computing section according to the first embodiment has feature value output sections 501 and 511 and random number output sections 502 and 512.

The structure and operation of feature extracting section 400 are the same as those of feature extracting section 410. In the following, only the structure and operation of feature extracting section 400 will be described to prevent redundancy.

Random number output section 502 randomly outputs one of two values according to a designated probability.

Feature value output section 501 compares a difference value and a representative value and computes a binary feature value based on the compared result. When the relationship between the difference value and the representative value satisfies a predetermined condition, feature value output section 501 causes random number output section 502 to randomly output one of two values and designates the obtained random binary value as a feature value.

In the following, an image similarity determining process according to the fourth embodiment will be described.

A process that feature extracting section 400 performs to obtain a target image from image capturing device 100 is the same as the process at step S101 shown in FIG. 3 according to the first embodiment.

Likewise, a process that feature extracting section 410 performs to obtain a target image from data processing device 300 is the same as the process at step S103 shown in FIG. 3 according to the first embodiment.

Next, a feature value computing process according to the fourth embodiment will be described.

Since the feature value computing process that feature extracting section 400 performs is the same as the feature value computing process that feature extracting section 410 performs, in the following, only the feature value computing process that feature extracting section 400 performs will be described to prevent redundancy.

Figure 8:
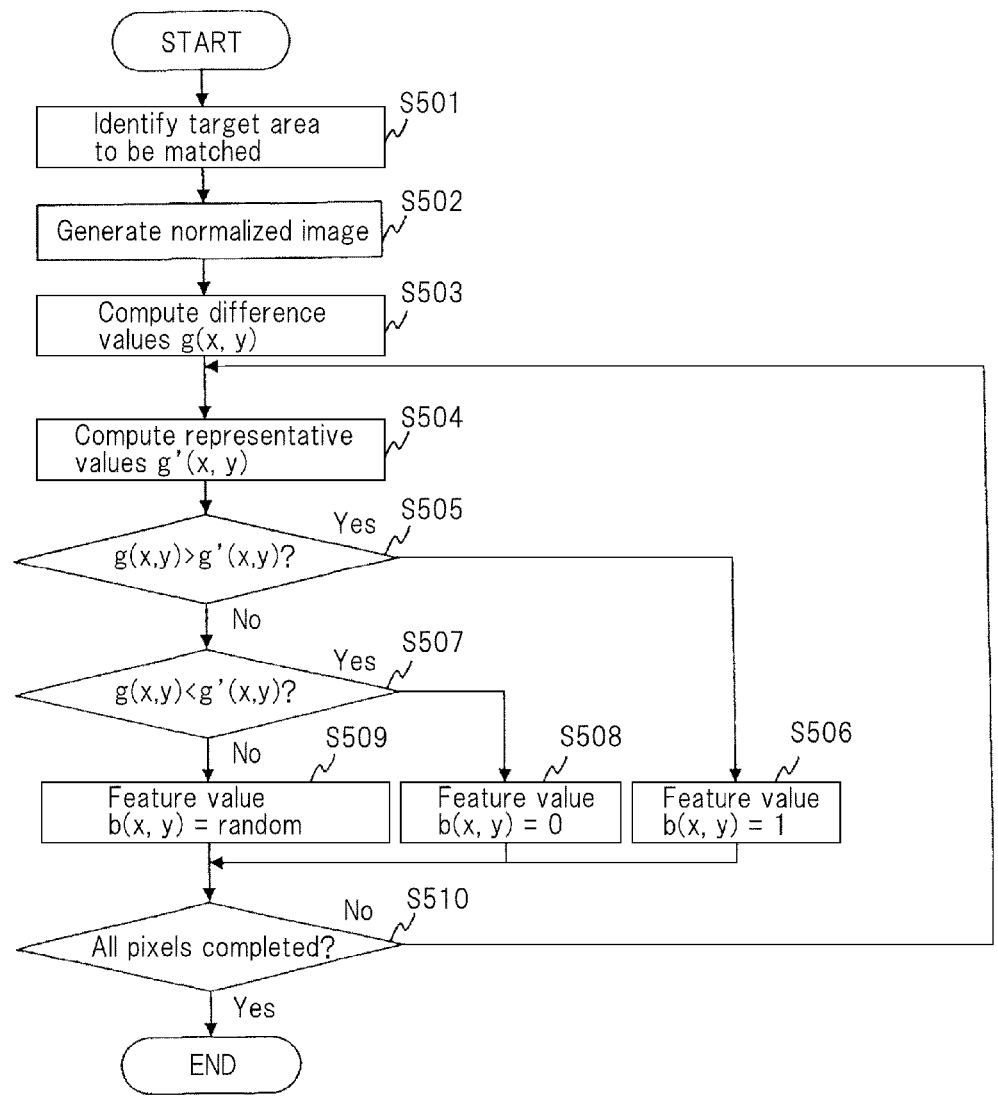
[FIG. 8] is a flow chart showing a feature value computing process according to the fourth embodiment.

FIG. 8 is a flow chart showing the feature value computing process according to the fourth embodiment.

Since the processes other than step S509 are the same as those according to the third embodiment, their description will be omitted.

When the determined result denotes that a difference value g(x, y) is the same as a representative value g'(x, y), feature value output section 501 causes random number output section 502 to randomly output one of two values with an equal probability and designates the feature value b(x, y) as a random binary value (at step S509).

The process that feature value computing section 404 performs can be formulated as Formula 12.

[Mathematical Formula 12]

$$b(x, y) = \begin{cases} 1 & (\text{if } g(x, y) > g'(x, y)) \\ \text{random} & (\text{if } g(x, y) = g'(x, y)) \\ 0 & (\text{if } g(x, y) < g'(x, y)) \end{cases} \quad (12)$$

A process that similarity determining section 301 performs to compute a correlation value s of a target image and a reference image based on feature values $b_a(x, y)$ with respect to the target image obtained from feature extracting section 400 and feature values $b_b(x, y)$ with respect to the reference image obtained from feature extracting section 410 is the same as the process at step S105 shown in FIG. 3 according to the first embodiment.

Likewise, a process that similarity determining section 301 performs to determine the similarity between the target image and the reference image based on the computed correlation value is the same as the process at step S106 shown in FIG. 3 according to the first embodiment.

As described above, according to this embodiment, when the relationship between a difference value and a representative value satisfies a predetermined condition, since the data processing device designates the feature value as one of two values, the random value is equivalent to the medium of the two values. Thus, although the feature value is represented as a binary value, an effect in which the feature value is represented as a ternary value can be obtained. Thus, while the storage capacity for a feature value is reduced and the process time for the image matching is shortened, the correlation value of pixels that satisfy a predetermined condition can be precisely evaluated and images can be accurately matched.

In addition, according to this embodiment, when a difference value matches a representative value, since the data processing device randomly designates a feature value as one of two values, the case in which a difference value is the same as a representative value can be distinguished, and a correlation value with respect to a pixel in which a difference value matches a representative value can be correctly evaluated.

Alternatively, in the feature value computing process that feature value computing section 404 performs, a threshold th may be designated in advance and if the difference between a difference value g(x, y) and a representative value g'(x, y) is smaller than the threshold th, the feature value b(x, y) may be designated as a random binary value.

The processes that feature value computing sections 404 and 414 perform at that point can be formulated as Formula 13.

[Mathematical Formula 13]

$$b(x, y) = \begin{cases} 1 & (\text{if } \{g(x, y) - g'(x, y)\} \geq th) \\ \text{random} & (\text{if } th > \{g(x, y) - g'(x, y)\} > -th) \\ 0 & (\text{if } \{g(x, y) - g'(x, y)\} \leq th) \end{cases} \quad (13)$$

When a determination condition in which a difference value is equal to a representative value is given a threshold, the influence of variation of a luminance value due to noise to a feature value can be reduced.

(Fifth Embodiment)

According to the first to fourth embodiments, the similarity between images is determined based on one representative value corresponding to one difference value. However, the present invention is not limited to such an example. Instead, the similarity between images may be determined based on a plurality of representative values corresponding to one difference value. According to a fifth embodiment, the similarity between images are determined based on a plurality of representative values corresponding to one difference value so as to improve the accuracy of the image matching.

The structure of an image matching system according to the fifth embodiment is the same as the structure of the image matching system according to the fourth embodiment.

In the following, an image similarity determining process according to the fifth embodiment will be described.

A process that feature extracting section 400 performs to obtain a target image from image capturing device 100 is the same as the process at step S101 shown in FIG. 3 according to the first embodiment.

Likewise, a process that feature extracting section 410 performs to obtain a target image from storage device 200 is the same as the process at step S103 shown in FIG. 3 according to the first embodiment.

Next, a feature value computing process according to the fifth embodiment will be described.

Since the feature value computing process that feature extracting section 400 performs is the same as the feature value computing process that feature extracting section 410 performs, only the feature value computing process that feature extracting section 400 performs will be described to prevent redundancy.

Figure 9:
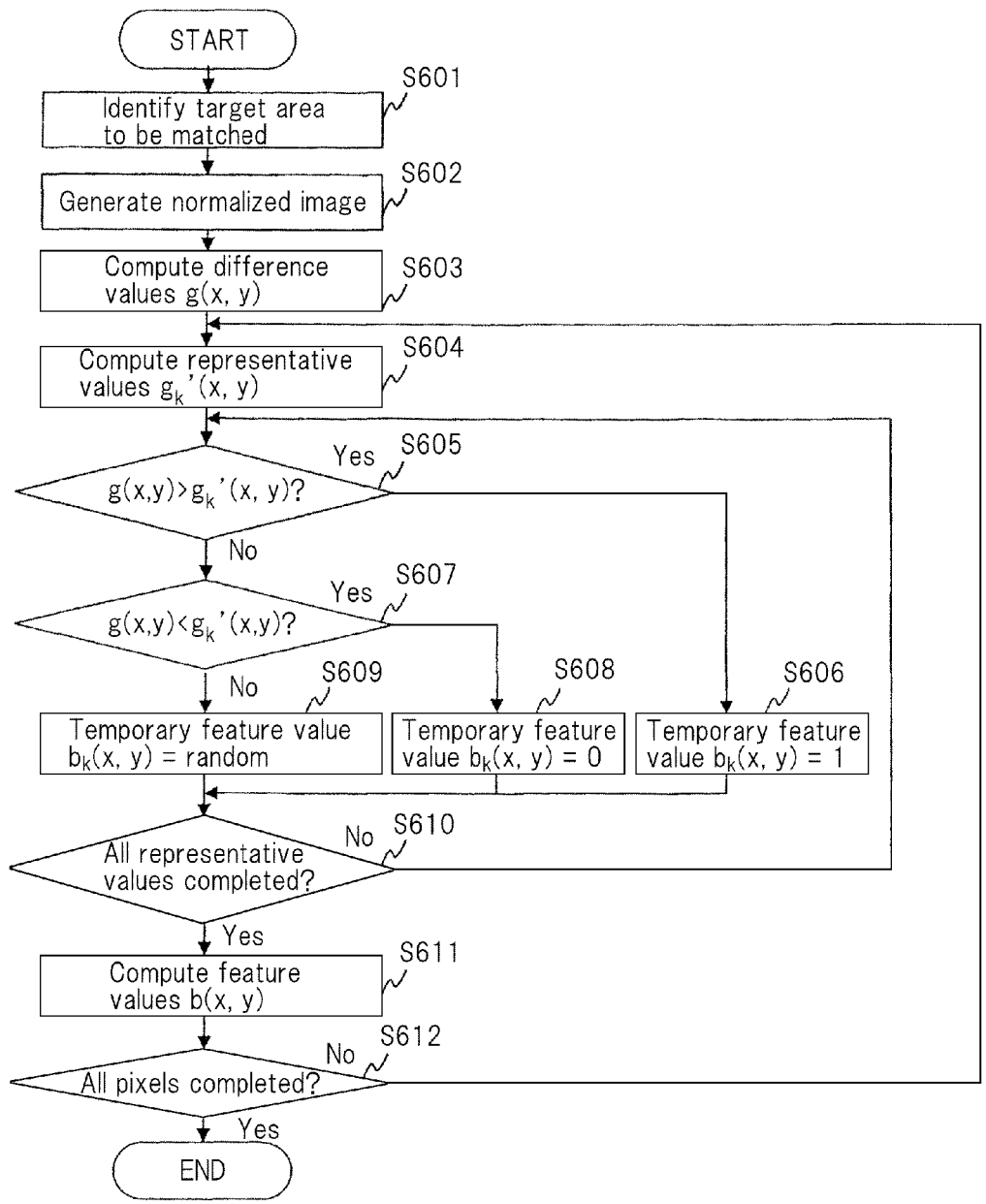
[FIG. 9] is a flow chart showing a feature value computing process according to a fifth embodiment.

FIG. 9 is a flow chart showing the feature value computing process according to the fifth embodiment.

Since a matching target area identifying process at step S601, a normalized image generating process at step S602, and a difference value computing process at step S603 are the same as those according to the first embodiment, their description will be omitted.

When difference value computing section 402 computes a difference value, representative value computing section 403 computes a plurality of representative values $g_1'(x, y)$ to $g_m'(x, y)$ corresponding to the difference value with respect to a target pixel (at step S604).

Representative value computing section 403 obtains a histogram of difference values with respect to individual pixels contained in a neighboring pixel group of the target pixel and selects a predetermined number of the difference values in the descending order of frequencies and designates the selected difference values as a plurality of representative values.

Alternatively, representative value computing section 403 may designate distributions of difference values with respect to individual pixels contained in the neighboring pixel group of the target pixel as a mixed normal distribution and then the mean values of the normal distributions of the mixed normal distribution as representative values.

Alternatively, representative value computing section 403 may designate difference values with respect to all pixels contained in the neighboring pixel group of the target pixel as representative values.

Feature value computing section 404 computes temporary feature values $b_1(x, y)$ to $b_m(x, y)$ based on comparison between a difference value $g(x, y)$ and a plurality of representative values $g_1'(x, y)$ to $g_m'(x, y)$.

Feature value computing section 404 determines whether or not the difference value $g(x, y)$ is greater than a representative value $g_k'(x, y)$ (at step S605). When the difference value $g(x, y)$ is greater than the representative value $g_k'(x, y)$, feature value computing section 404 sets a temporary feature value $b_k(x, y)$ to 1 (at step S606). In contrast, when the difference value $g(x, y)$ is not greater than the representative value $g_k'(x, y)$, feature value computing section 404 determines whether or not the difference value $g(x, y)$ is smaller than the representative value $g_k'(x, y)$ (at step S607). When the difference value $g(x, y)$ is smaller than the representative value $g_k'(x, y)$, feature value computing section 404 sets the temporary feature value $b_k(x, y)$ to 0 (at step S608). In contrast, when the difference value $g(x, y)$ is not smaller than the representative value $g_k'(x, y)$, feature value computation section 404 determines that the difference value $g(x, y)$ is the same as the representative value $g_k'(x, y)$, feature value computing section 404 causes random number output section 502 to randomly output one of two values with an equal probability and designates the temporary feature value $b_k(x, y)$ as a random binary value (at step S609).

The process that feature value computing section 404 performs can be formulated as Formula 14.

[Mathematical Formula 14]

$$b_k(x, y) = \begin{cases} 1 & (\text{if } g(x, y) > g_k'(x, y)) \\ \text{random} & (\text{if } g(x, y) = g_k'(x, y)) \\ 0 & (\text{if } g(x, y) < g_k'(x, y)) \end{cases} \quad (14)$$

Temporary feature values are computed with respect to all representative values. Thus, feature extracting section 400 determines whether or not temporary feature values with respect to all representative values corresponding to each difference value have been computed (at step S610) and repeats the processes from step S605 to step S610 until temporary feature values with respect to all representative values are computed.

After temporary feature values with respect to all combinations of a particular difference value and all representative values have been computed, feature value output section 501 computes a generation probability of a binary value based on all the computed temporary feature values $b_1(x, y)$ to $b_m(x, y)$ that have been computed and causes random number output section 502 to generate a binary random number based on the generation probability and designates the random number as a feature value $b(x, y)$ corresponding to the difference value (at step S611). For example, when the number of temporary feature values $b_1(x, y)$ to $b_m(x, y)$ that are 1 is α and the number of temporary feature values $b_1(x, y)$ to $b_m(x, y)$ that are 0 is (m−α), feature value output section 501 causes random number output section 502 to randomly output 1 and 0 with a probability of a:(m−α) to random number output section 502 and designates the obtained value as a feature value with respect to the target pixel.

Feature extracting section 400 determines whether or not representative values and feature values with respect to all pixels of the normalized image have been computed (at step S612) and repeats the processes from step S604 to step S612 until representative values and feature values with respect to all the pixels contained in the normalized image are computed.

A process that similarity determining section 301 performs to compute a correlation value s of the target image and the reference image based on feature values $b_a(x, y)$ with respect to the target image obtained from feature extracting section 400 and feature values $b_b(x, y)$ with respect to the reference image obtained from feature extracting section 410 is the same as the process at step S105 shown in FIG. 3 according to the first embodiment.

Likewise, a process that similarity determining section 301 performs to determine the similarity between the target image and the reference image based on the computed correlation value is the same as the process at step S106 shown in FIG. 3 according to the first embodiment.

As described above, according to this embodiment, since the data processing device uses a plurality of representative values, even if a plurality of regions that differ in characteristics of illumination variation are contained in a neighboring pixel group of the target pixel, feature values can be computed based on comparison between representative values of the individual regions and thereby the influence of the shading due to the shape of the object under illumination variation can be more accurately reduced.

In addition, according to this embodiment, since the data processing device designates difference values having high frequencies with respect to pixels contained in a neighboring pixel group of a target pixel, mean values of normal distributions contained in a mixed normal distribution of difference values, or all difference values as representative values, a plurality of regions having different characteristics can be adequately extracted.

Like the fourth embodiment, in the process that feature value computing section 404 performs to compute a feature value, a threshold th may be designated in advance and if the difference between a difference value $g(x, y)$ and a representative value $g_k'(x, y)$ is smaller than the threshold th, a feature value $b_k(x, y)$ may be designated as a random binary value.

The process that feature value computing section 404 performs at that point can be formularized as Formula 15.

[Mathematical Formula 15]

$$b_k(x, y) = \begin{cases} 1 & (\text{if } \{g(x, y) - g_k'(x, y)\} \geq th) \\ \text{random} & (\text{if } th > \{g(x, y) - g_k'(x, y)\} > -th) \\ 0 & \{g(x, y) - g_k'(x, y)\} \leq -th \end{cases} \quad (15)$$

When a threshold is given to the determination condition in which a difference value is equal to a representative value, the influence of variation of a luminance value due to noise to a feature value can be reduced.

The image matching system according to the present invention can be applied to an individual authentication system using a biometric image. At this point, storage device 200 stores biometric images in advance and image capturing device 100 captures a biometric image of the user. Feature extracting sections 400 and 410 compute a feature value with respect to the biometric image stored in storage device 200 and a feature value with respect to the biometric image captured by image capturing device 100. Thereafter, similarity determining section 301 compares a correlation value with a predetermined threshold so as to determine whether the user is the identical person.

The individual identification system using a biometric image compares a pre-captured biometric image with a newly captured biometric image so as to authenticate whether the user is a true person. Thus, in ordinary individual identification systems, if light used when a reference image is captured varies from light used when a target image is captured, the matching accuracy becomes lower and thereby the authentication often fails. In particular, when a face image is used as a biometric image, since the numbers and locations of regions such as eyes, nose, cheeks, and so forth are almost the same among persons' faces, the image tends to be influenced by the shading due to light variability and therefore illumination variation is a large disturbing factor for the individual authentication systems.

When the image matching system according to the present invention is applied to an individual authentication system that uses a biometric image, in particular, a face image, even if light varies, the user can be highly accurately authenticated.

In addition, the image matching system according to the present invention can be applied to image matching systems that determine whether or not letters, figures, or patterns drawn on objects having similar shapes match each other.

Now, with reference to the embodiments, the present invention has been described. However, it should be understood by those skilled in the art that the structure and details of the present invention may be changed in various manners without departing from the scope of the present invention.

DESCRIPTION OF REFERENCE NUMERALS

100 Image capturing device
200 Storage device
300 Data processing device
301 Similarity determining section
400, 410 Feature extracting section
401, 411 Matching target object extracting section
402, 412 Difference value computing section
403, 413 Representative value computing section
404, 414 Feature value computing section
501, 511 Feature value output section
502, 512 Random number output section

The invention claimed is:

1. A data processing device, comprising:
difference value computing means that computes a difference value between a pixel value of a target pixel that is each pixel contained in an image and a pixel value of a pixel that is present at a predetermined neighboring relative position of the target pixel;
representative value computing means that extracts a pixel group containing pixels that are similarly influenced by shading due to light from the image with respect to each pixel of the image and computes a representative value of difference values of the pixel group according to a statistical technique;
feature value computing means that computes a feature value with respect to each pixel contained in the image based on comparison between the difference value with respect to each pixel and the representative value of difference values of the pixel group; and
similarity determining means that determines a similarity between the image and a predetermined image based on the feature value with respect to each pixel extracted by the feature value computing means.

2. The data processing device as set forth in claim 1, wherein the difference value computing means includes at least a first difference value computing section that processes a captured image captured under illumination variation,
wherein the representative value computing means includes at least a first representative value computing section that processes the captured image;

wherein the feature value computing means includes at least a first feature value computing section that processes the captured image, and wherein the similarity determining means determines a similarity between the captured image and a reference image to be compared with the captured image based on the feature value with respect to each pixel contained in the captured image extracted by the feature value computing means.

3. The data processing device as set forth in claim 2, wherein the difference value computing means further includes a second difference value computing section that processes the reference image to be compared with the captured image, wherein the representative value computing means further includes a second representative value computing section that processes the reference image, wherein the feature value computing means further includes a second feature value computing section that processes the reference image, and wherein the similarity determining means determines a similarity between the captured image and the reference image based on comparison between the feature value with respect to each pixel contained in the captured image extracted by the first feature value computing section and the feature value with respect to each pixel contained in the reference image extracted by the second feature value computing section.

4. The data processing device as set forth in claim 1, wherein the pixel group with respect to the pixel is a set of pixels in a predetermined relative range from the pixel.

5. The data processing device as set forth in claim 1, wherein the pixel group with respect to the pixel is a set of pixels having difference values that differ from the difference value of the pixel by a predetermined value or less.

6. The data processing device as set forth in claim 1, wherein when the number of pixels contained in the pixel group is less than a predetermined number, the representative value is computed based on the difference values of all the pixels contained in an image from which the pixel group is extracted according to a statistical method.

7. The data processing device as set forth in claim 1, wherein when the number of pixels contained in the pixel group is less than a predetermined number, the representative value is a predetermined value.

8. The data processing device as set forth in claim 1, wherein the feature value is expressed as a binary value or a ternary value.

9. The data processing device as set forth in claim 8, wherein when the difference value and the representative value satisfy a predetermined condition, the feature value is randomly one of two values.

10. The data processing device as set forth in claim 9, wherein the predetermined condition is that the difference value is the same as the representative value.

11. The data processing device as set forth in claim 9, wherein the predetermined condition is that the difference between the difference value and the representative value is less than a predetermined threshold.

12. The data processing device as set forth in claim 1, wherein the representative value computing means computes a plurality of representative values of difference values of the pixel group based on the difference value with respect to each pixel contained in the pixel group according to a statistical technique, and wherein the feature value computing means computes a plurality of temporary binary feature values with respect to each pixel based on comparison between the difference value with respect to each pixel and a plurality of representative values of the difference values of the pixel group with respect to each pixel and randomly generates the feature value with respect to each pixel with an occurrence probability of two values based on the plurality of feature values.

13. The data processing device as set forth in claim 12, wherein the plurality of values computed as the representative values are values selected in a descending order of frequencies from the difference values with respect to each pixel contained in the pixel group.

14. The data processing device as set forth in claim 12, wherein the plurality of values computed as the representative values are mean values of a plurality of normal distributions contained in a mixed normal distribution that is a distribution of the difference values with respect to each pixel contained in the pixel group.

15. The data processing device as set forth in claim 12, wherein the plurality of values computed as the representative values are difference values with respect to all the pixels contained in the pixel group.

16. The data processing device as set forth in claim 1, wherein the difference value computing means designates a plurality of the predetermined relative positions and obtains a difference value between a pixel value of the target pixel and a pixel value each of the pixels that are present at the relative positions to the target pixel, wherein the representative value computing means extracts the pixel group for each of the relative positions with respect to each pixel contained in the image and computes a representative value of difference values of the pixel group, wherein the feature value computing means computes the feature value at each of the relative positions with respect to each pixel contained in the image, and wherein the similarity determining means determines a similarity between the image and a predetermined image based on comparison between feature values at each of the relative positions with respect to each pixel of the image and the predetermined image.

17. The data processing device as set forth in claim 1, wherein the image is a biometric image captured under illumination variation, and wherein the similarity determining means determines a similarity between the biometric image and an image that has been captured for comparison with the biometric image so as to perform a biometric authentication.

18. The data processing device as set forth in claim 17, wherein the biometric image is a facial image.

19. An image matching method, comprising:

computing a difference value between a pixel value of a target pixel that is each pixel contained in an image and a pixel value of a pixel that is present at a predetermined neighboring relative position of the target pixel;

extracting a pixel group containing pixels that are similarly influenced by shading due to light from the image with respect to each pixel of the image and computing a representative value of difference values of the pixel group according to a statistical technique;

computing a feature value with respect to each pixel contained in the image based on comparison between the difference value with respect to each pixel and the representative value of difference values of the pixel group; and determining a similarity between the image and a predetermined image based on the feature value with respect to each pixel.

20. An image processing system, comprising:

an image capturing device that captures a predetermined target object and outputs a captured image;

a storage device that stores a reference image of the target object that has been captured; and a data processing device that computes a difference value between a pixel value of a target pixel that is each pixel contained in an image and a pixel value of a pixel that is present at a predetermined neighboring relative position of the target pixel for each of the captured image and the reference image, extracts a pixel group containing pixels that are similarly influenced by shading due to light from the image with respect to each pixel of the image and computing a representative value of difference values of the pixel group according to a statistical technique for each of the captured image and the reference image, computes a feature value with respect to each pixel contained in the image based on comparison between the difference value with respect to each pixel and the representative value of difference values of the pixel group for each of the captured image and the reference image, and determines a similarity between the captured image and the reference image based on the feature value with respect to each pixel.

* * * * *